May 16, 1950     A. O. LUND ET AL     2,508,179

MOTOR CONTROL SYSTEM

Filed Sept. 3, 1948     3 Sheets-Sheet 1

WITNESSES:

INVENTORS
Alvin O. Lund &
Charles A. Dana.
BY
ATTORNEY

May 16, 1950 A. O. LUND ET AL 2,508,179
MOTOR CONTROL SYSTEM
Filed Sept. 3, 1948 3 Sheets-Sheet 2

WITNESSES:
E. G. McCloskey
Wm. B. Sellers

INVENTORS
Alvin O. Lund &
Charles A. Dana
BY C. L. Freedman
ATTORNEY

May 16, 1950     A. O. LUND ET AL     2,508,179
MOTOR CONTROL SYSTEM

Filed Sept. 3, 1948     3 Sheets-Sheet 3

WITNESSES:

INVENTORS
Alvin O. Lund &
Charles A. Dana.
BY
ATTORNEY

Patented May 16, 1950

2,508,179

UNITED STATES PATENT OFFICE 2,508,179

MOTOR CONTROL SYSTEM

Alvin O. Lund, East Orange, N. J., and Charles A. Dana, Wheatridge, Colo., assignors to Westinghouse Electric Corporation, East Pittsburgh, Pa., a corporation of Pennsylvania Application September 3, 1948, Serial No. 47,558

24 Claims. (Cl. 318—158)

This invention relates to a motor control system, and it has particular relation to a variable voltage motor drive having accurately regulated speeds of operation.

In conventional variable voltage motor drives, it is often the practice to provide a plurality of accurately controlled speeds of operation. For example, in a variable voltage drive for an elevator system, provision may be made for full speed operation and for slow speed operation preparatory to stopping the car accurately at a desired floor.

In accordance with the invention, the generator of a variable voltage motor drive system is provided with two field windings. These fields are connected cumulatively for purposes of acceleration and full speed operation. The fields are connected differentially for slow speed operation.

One of the two field windings may be excited from a suitable source of direct current. In a preferred embodiment of the invention, this field winding is connected in shunt across the terminals of the generator armature. The remaining field winding is separately excited in accordance with an error voltage which represents the difference between the speed of the motor connected to the generator and a predetermined pattern or reference quantity. In a preferred embodiment of the invention, the excitation of the separately excited field is effected through one or more grid controlled rectifiers, such as thyratons. By connecting in the grid circuit of the thyratrons a resistor which is shunted by a capacitor, derivative damping is introduced for substantially eliminating hunting of the system.

For the purpose of determining the error voltage, a voltage responsive to motor speed is compared to a pattern or reference voltage. Both of these voltages may be adjustable. The voltage responsive to motor speed preferably is derived through a circuit having a time constant for producing a smooth or gradual response of the system to a change in adjustment of the voltage.

In order to improve the response of the system to a reduction in the pattern voltage, the pattern voltage initially may be adjusted to an abnormally low value to produce a rapid retardation of the motor. This initial adjustment subsequently is followed by restoration of the pattern voltage to a larger value calculated to produce the desired slow speed of operation of the motor. The adjustment of the pattern voltage preferably is effected through a time-delay circuit for producing a smooth or gradual change in pattern voltage. The system forces the elevator car or other load to follow a speed pattern controlled by the pattern voltage.

It is therefore an object of the invention to provide a variable voltage system for controlling a motor wherein an improved circuit produces generator field excitation.

It is a further object of the invention to provide a variable voltage system for energizing a motor from a generator wherein the generator has two field windings and wherein control circuits are provided for connecting the fields differentially or cumulatively.

It is another object of the invention to provide a variable voltage system for energizing a motor from a generator wherein a voltage representative of motor speed is compared to a pattern voltage for control purposes and wherein an improved control circuit for the pattern voltage is provided.

It is another object of the invention to provide a system, as defined in the preceding paragraph, wherein a time delay is provided for any change in the voltage representative of speed of the motor.

It is a still further object of the invention to provide regenerative field excitation for a generator.

It is an additional object of the invention to provide an elevator system having improved control circuits for providing suitable elevator running and landing speeds.

It is also an object of the invention to provide an improved adjustable speed-regulator system for a variable voltage motor drive wherein a circuit having a substantial time constant is employed for controlling the rate of response of a motor to a change in adjustment of the speed regulator, and wherein derivative damping is provided for the motor.

Other objects of the invention will be apparent from the following discussion taken in conjunction with the accompanying drawings, in which.

Figure 1:
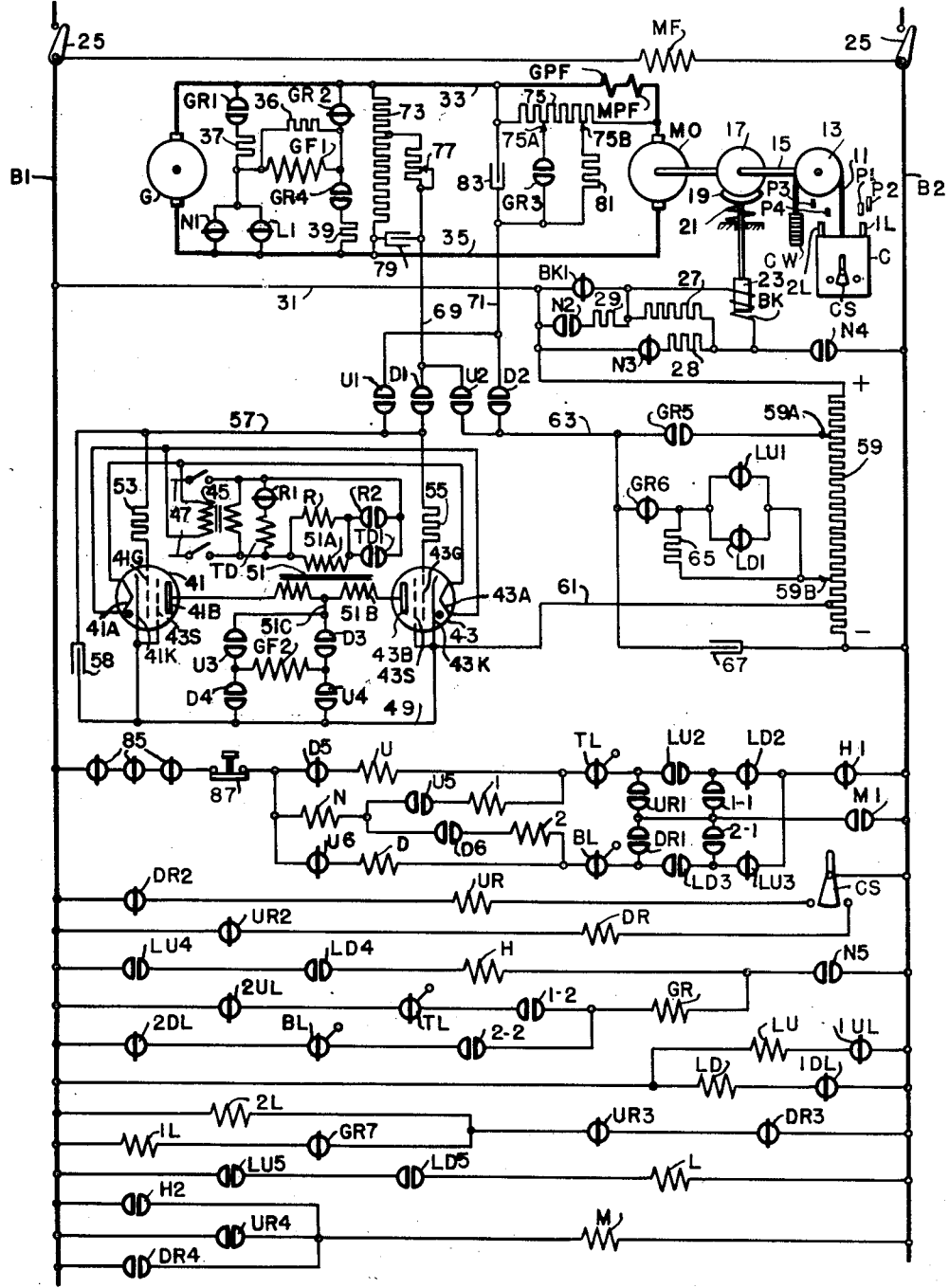
Figure 1 is a schematic view of an elevator system embodying the invention. The control circuits of Fig. 1 are illustrated in straight line form.
Figure 1A:
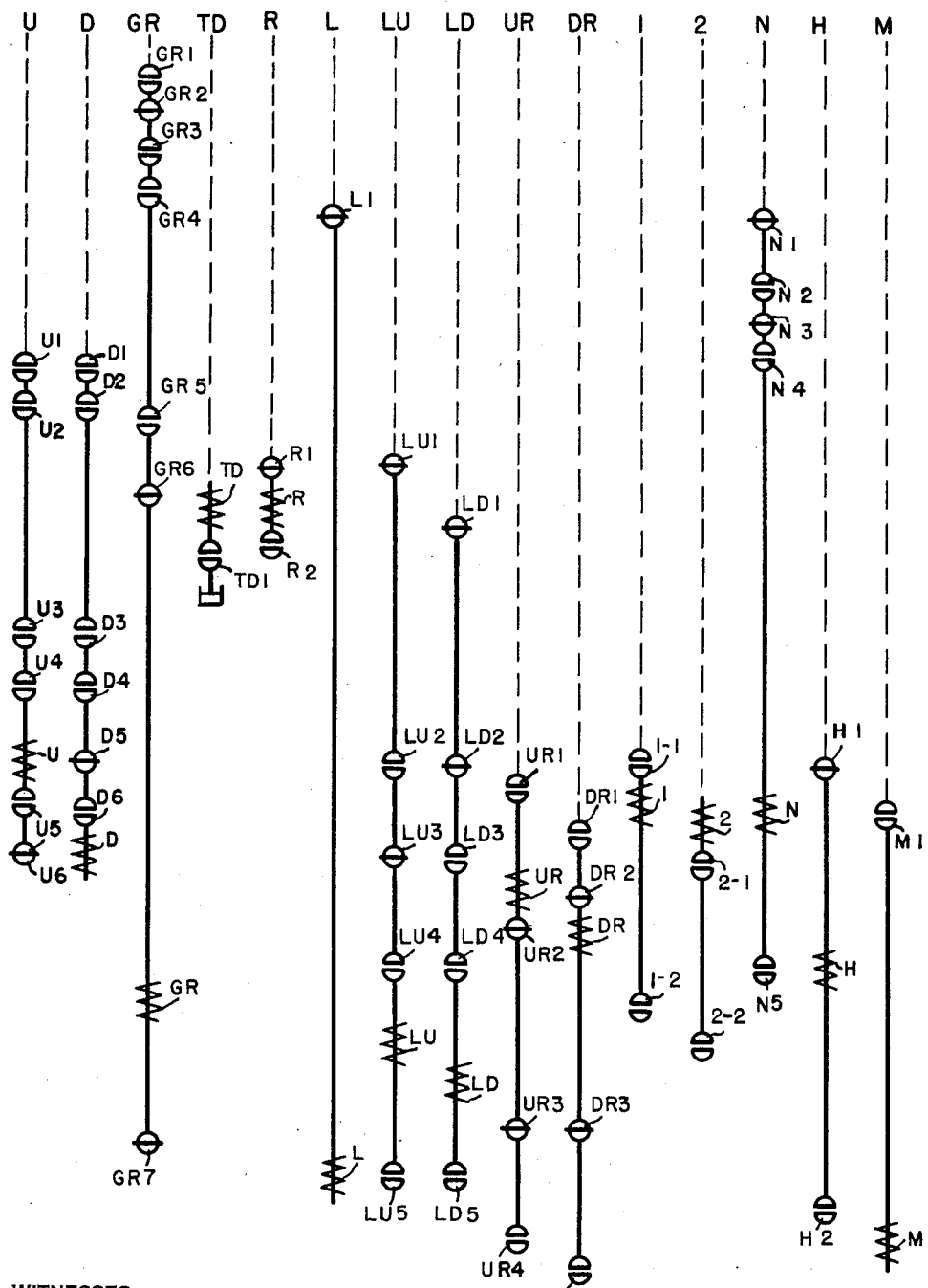
Fig. 1A is a key diagram showing the coils and contacts of relays and switches utilized in the system of Fig. 1 in vertical alignment. By placing Figs. 1 and 1A in horizontal alignment, the vertical positions of contacts and relay or switch coils in Fig. 1 readily may be ascertained by reference to Fig. 1A.

Referring to the drawings, Fig. 1 shows an elevator car C which is connected to a counterweight CW through a suitable flexible rope or cable 11 which passes around a sheave 13. The car C is intended for movement in a vertical direction to serve a plurality of floors in a building within which the elevator system is installed. In order to facilitate the accurate landing of the elevator car at a desired floor, various expedients known to the prior art may be employed. For the purpose of discussion, it will be assumed that the car C carries two inductor relays 1L and 2L. The inductor relay 1L is a leveling relay which cooperates with pairs of inductor plates P1 and P2 at each floor to level the car. The inductor relay 2L is intended to initiate deceleration of the elevator car at a predetermined distance from a desired floor at which the elevator car is to stop. To this end, the inductor relay 2L cooperates with inductor plates P3 and P4 which are mounted in the elevator hatch for each floor of the associated building. Such inductor relays and inductor plates are well known in the art. See, for example, the White et al. Patent 1,884,446.

The elevator car may be controlled in any suitable manner. For example, the elevator car may be provided with a car button for each floor of the building served by the elevator car and may be designed for full automatic control. For the purpose of discussion, however, it will be assumed that the elevator car C is controlled by a car switch CS mounted in the elevator car.

The sheave 13 is secured to a shaft 15 which is mounted for rotation about its axis by suitable means not shown. The shaft 15 carries a brake drum 17 and is designed to be rotated by a direct-current elevator motor MO.

The brake drum 17 has a brake shoe 19 biased into braking engagement with the drum by means of a coil spring 21. The brake shoe 19 is released from the brake drum 17 by means of a brake solenoid or coil BK having a magnetic armature 23 associated therewith. When the coil BK is energized, the brake shoe 19 is withdrawn from the drum 17 against the bias of the spring 21.

For energizing the various control circuits, a pair of buses B1 and B2 may be connected to a suitable source of direct current through switches 25. These buses are employed to energize various relays and switches. For the purpose of facilitating an understanding of the invention, the reference characters employed for designating certain of the switches and relays are listed as follows:

U=up direction switch
D=down direction switch
UR=up direction relay
DR=down direction relay
M=car running relay
N=auxiliary car running relay
GR=speed control relay
1L=leveling inductor relay
2L=slowdown inductor relay
LU=up leveling relay
LD=down leveling relay
H=holding relay When contacts of a relay switch are referred to, they are designated by the reference character for the switch followed by a number indicating the specific contacts referred to.

Returning to the brake mechanism, it may be noted that the brake coil BK is shunted by a brake discharge resistor 27. When the brake is to be released, an auxiliary car running relay N is actuated to close its contacts N4. Closure of the contacts establishes an energizing circuit for the brake coil BK which may be traced from the bus B2 through the contacts N4, the brake coil BK and the resistor 27 in parallel, the brake contacts BK1 of the brake and the conductor 31 to the bus B1. As the brake is released, it opens its contacts BK1 to introduce through contacts N—2 a resistor 2 in the brake energizing circuit. This decreases the current flowing through the brake coil to a value merely sufficient to maintain the brake in released position.

Opening of the contacts N—4 opens the energizing circuit for the brake coil BK. The brake coil dissipates its collapsing magnetic field rapidly through the high resistance discharge resistor 27 until the brake shoe has been partially reapplied. At this time, the back contacts BK1 reclose to connect the resistor 29 through the back contacts N3 across the brake coil. The resulting substantial decrease in the resistance connected across the brake coil slows or "softens" the remainder of the reapplication of the brake.

In order to energize the motor MO, a motor-generator set is provided which is represented by the commutator of the generator G. It will be understood that the generator in operation is rotated at a substantially constant speed by means of its associated motor. The generator G has its armature connected in a loop circuit with the armature of the motor MO by means of conductors 33 and 35. Interpole field windings GPF and MPF for the motor MO also are connected in the loop circuit for energization. The motor MO is provided with a single field winding MF which is connected between the buses B1 and B2.

Field excitation for the generator G is provided by two field windings GF1 and GF2. The field winding GF1 may be energized from any suitable source, but in a preferred embodiment of the invention, it is connected in shunt across the terminals of the armature of the generator G. A field discharge resistor 36 is connected across the field winding GF1. In order to improve the control of the elevator motor, the field winding GF1 is arranged to be reversibly connected across the armature of the generator G. To this end, contacts GR1, GR2 and GR4 of a speed control relay GR are provided, together with contacts L1 of an auxiliary relay and contacts N1 of an auxiliary car running relay. With the contacts in the positions illustrated in Fig. 1, the generator field winding GF1 is connected between the conductors 33 and 35 through a circuit which may be traced from the conductor 33 through the contacts GR2, the generator field winding GF1 and the contacts N1 and L1 to the conductor 35. When the contacts GR2, N1 and L1 are open, the contacts GR1 and GR4 are closed to connect the generator field winding GF1 across the conductors 33 and 35 in a reverse direction for the purpose of reversing the field produced by this winding. Resistors 37 and 39 may be provided for the purpose of controlling the magnitude of the energization of the winding GF1.

The second generator field winding GF2 may be referred to as a regulating field winding, and the current supplied thereto is controlled for the purpose of accurately controlling the speed of the motor MO. The field winding GF2 may be energized from any suitable controllable source, but in a preferred embodiment of the invention it is energized through one or more grid-controlled tubes from a source of alternating current. In order to provide full-wave rectification of the alternating current, preferably two grid-controlled rectifier tubes 41 and 43 are provided. These are of the gaseous-discharge type known as thyratrons. The thyratrons are illustrated as of the indirectly-heated-cathode type having heaters 41A and 43A which are connected for energization from the secondary winding of a transformer 45. The primary winding of the transformer 45 is connected through a switch to a source of alternating current represented by terminals 47. The cathodes 41K, 43K and shield grids 41S, 43S of the thyratrons are connected to each other through a conductor 49.

The rectifier of Fig. 1 may be a polyphase rectifier, if so desired. However, for the purpose of simplicity, it is illustrated as a single-phase full-wave rectifier. Plate voltage for the thyratrons 41 and 43 is supplied from the terminals 47 through a transformer 51. The primary winding 51A of this transformer is connected to the terminals 47 after a time delay has elapsed sufficient to permit adequate heating of the heaters 41A and 43A. To this end, a time delay relay TD is connected across the primary winding of the transformer 45 through back contacts R1 of a holding relay R. The time delay relay TD has a time delay in operation sufficient to permit adequate heating of the heaters 41A and 43A. At the expiration of its time delay, the relay TD operates to close its contacts TD1. This connects the primary winding 51A and the holding relay R in parallel across the primary winding of the transformer 45. The holding relay R promptly operates to close its contacts R2, thereby establishing a holding circuit across the contacts TD1. The holding relay also opens its contacts R1 to deenergize the time delay relay TD. Because of such deenergization, the full time delay of the relay TD is available should a subsequent interruption of power occur.

The tubes 41 and 43 have their plates or anodes 41B and 43B connected respectively to the terminals of the secondary winding 51B of the transformer 51. This secondary winding is provided with a center tap 51C. The generator field winding GF2 is reversibly connected between the center tap 51C and the conductor 49. For example, when the contacts U3 and U4 of the up direction switch U are closed, the generator field winding GF2 is connected with proper polarity to produce movement of the elevator car C in an up direction. Conversely, when the contacts D3 and D4 of the down direction switch are closed, the generator field winding GF2 is connected with proper polarity to produce downward travel of the elevator car C.

The outputs of the thyratrons are controlled by means of the thyratron control grids 41G and 43G. These grids are connected respectively through resistors 53 and 55 to a conductor 57. Operation of the thyratrons may be improved by connecting a capacitor 58 between the conductors 49 and 57. It will be understood that the voltage applied between the conductors 49 and 57 controls the firing of the thyratrons.

An error voltage is applied between the conductors 49 and 57 for the purpose of controlling the output of the thyratrons. This error voltage represents the difference between a speed voltage, which represents the speed of the motor MO, and a pattern voltage, which determines the desired speed of the motor. The pattern voltage conveniently may be obtained from a voltage divider or resistor 59 which is connected between the buses B1 and B2. The pattern voltage derived from the voltage divider appears between a conductor 61, which is connected to the conductor 49, and a conductor 63. The conductor 61 is connected to a fixed point on the voltage divider 59. The conductor 63 is connected through front contacts GR5 of the speed control relay GR to an adjustable tap 59A on the voltage divider to provide a pattern voltage suitable for acceleration and full-speed operation of the motor MO. For slow speed operation, the conductor 63 is connected through back contacts GR6 of the speed control relay to an adjustable tap 59B on the voltage divider. This connection may be effected either through a resistor 65 or through one of two sets of contacts LU1 and LD1. These are contacts of the up leveling and down leveling relays. It will be understood that adjustment of the tap 59A adjusts the full-speed of the motor MO whereas adjustment of the tap 59B adjusts the low speed of the motor. The tap 59B may be adjusted to a point on the voltage divider which is negative relative to the conductor 61 if so desired.

An energy storage device or a capacitor 67 is connected between the negative terminal of the voltage divider and the conductor 63. The capacitor is connected to a point on the voltage divider which is negative with respect to the conductor 61. The capacitor 67 and the resistor 65 have a time constant which makes gradual and smooth the transition of the pattern voltage from the high speed value to the low speed value. The resulting deceleration of the elevator car is smooth. The delay in reaching the new voltage or the time constant depends on the values of resistance and capacitance employed.

It will be recalled that the pattern voltage is compared to a speed voltage representing the speed of the motor MO. This speed voltage may be obtained from a tachometer generator mounted on the shaft 15, as pointed out in the Martin et al. Patent 2,313,955. However, it is preferable to obtain the speed voltage directly from the motor MO. One system for obtaining a speed voltage from the motor of a variable voltage drive is disclosed in the King Patent 2,389,367.

In the embodiment of Fig. 1, a speed voltage representing the speed of the motor MO is applied between conductors 69 and 71. The conductor 69 is connected to a tap on a voltage divider or resistor 73 which in turn is connected across the conductors 33 and 35 of the loop. The voltage across the voltage divider 73 represents the generator armature voltage. The voltage across the voltage divider 73 differs from the counter-electromotive force or speed voltage of the motor MO by a factor dependent on the resistance drop in the interpole field windings and in the armature of the motor MO resulting from load current flowing therethrough. For this reason, the voltage derived from the voltage divider 73 is compensated by a suitable compensating voltage to obtain the desired resultant speed voltage. The compensating voltage may be derived from a resistor connected in the loop circuit. However, it has been found that a suitable compensating voltage may be derived from a resistor or voltage divider 75 which is connected in parallel with the interpole field windings GPF and MPF. The voltage divider 75 has a current flowing therethrough which is proportional to the load current supplied to the motor MO. The compensating voltage is introduced by connecting the conductor 71 to an adjustable tap 75A on the voltage divider 75 through front contacts GR3 of the speed control relay GR. When the contacts GR3 are closed, portions of the voltage dividers 73 and 75 are connected differentially in series to provide a speed voltage between the conductors 69 and 71, which represents accurately the speed of the motor MO.

The voltage between the conductors 69 and 71 is connected differentially in series with the voltage across the conductors 63 and 61 to apply between the conductors 57 and 49 an error voltage which represents the deviation in speed of the motor MO from that represented by the pattern voltage between the conductors 61 and 63. Since the polarity of the voltage between the conductors 69 and 71 reverses in response to a reversal in the polarity of the generator G, the speed voltage is connected to the pattern voltage through a reversing switch represented by the contacts U1 and U2 of the up direction switch and the contacts D1 and D2 of the down direction switch. When the system is conditioned for upward travel of the elevator car, the contacts U1 and U2 are closed. When the elevator car is conditioned for downward travel, the contacts D1 and D2 are closed. This assures differential connection of the speed and pattern voltages for both conditions of operation.

The capacitor 79 and the resistor 77 provide first derivative damping to oppose any tendency of the system to hunt. In response to any change in the voltage between the conductors 33 and 35, the resulting change in the voltage across the voltage divider 73 causes a capacitor charging or discharging current to flow through the resistor 77. Such current produces a voltage drop across the resistor 77 which changes the bias applied between the grids and cathodes of the thyratrons. If the capacitor 79 is connected between the conductor 69 and the proper one of the conductors 33 and 35, the consequent change in the energization of the regulating field winding GF2 is in a direction opposing the change in voltage between the conductors 33 and 35. Consequently, the capacitor 79 and resistor 77 compensate for any tendency of the system to hunt.

The compounding or voltage requirements of motors may differ for different motors and for different speeds of a given motor. Therefore, when the speed of the motor MO is changed, it may be desirable to change the compounding of the regulator system. For example, some conventional elevator motors require more compounding in the regulator system at landing speed than at high speed. Such a change may be introduced by connecting the conductor 71 to an adjustable tap 75B on the voltage divider 75 when the contacts GR3 open. It will be observed that the tap 75B incorporates a larger portion of the compensating voltage appearing across the voltage divider 75 and consequently decreases the magnitude of the voltage which appears across the conductors 69 and 71. The tap 75B has a compounding effect higher than that of the tap 75A.

In order to decrease the shock introduced by the sudden transition from the voltage represented by the tap 75A to that represented by the tap 75B, a predetermined time delay in the transition between two voltages is introduced. Such time delay may be provided by introducing a resistor 81 between the conductor 71 and th tap 75B, and by introducing a capacitor 83 between the conductors 71 and 33. When the contacts GR3 open, the resulting increase in the voltage across the capacitor 83 results in the flow of substantial charging current to the capacitor through the resistor 81. The charging current and the voltage drop across the resistor 81 decrease at a rate dependent on the time constant of the charging circuit. Inasmuch as the voltage drops across the voltage divider 75 and the resistor 81 are in opposition, the opening of the contacts GR3 results in a gradual change in the speed voltage to its new value. Also, the resistor 81 and the capacitor 83 introduces substantial second-derivative damping for the system when operating at landing speed. This damping tends to smooth out any irregularities in speed otherwise resulting from intermittent firing of the thyratrons.

Turning now to the control circuits for the various relays and switches, it will be observed that the car switch CS may be operated in a clockwise direction from the neutral position illustrated in Fig. 1 to energize an up direction relay UR or in a counterclockwise direction to energize a down direction relay DR. The up direction relay UR by closure of its contacts UR1 conditions the up direction switch U for subsequent energization. In a similar manner, the down direction relay by closure of the contacts DR1 conditions the down direction switch D for subsequent closure. The control circuits for the up and down direction switches also include contacts LD2, LD3, LU2 and LU3 of leveling relays LU and LD. These will be discussed later.

Operation of either of the relays UR or DR results in energization of a car running relay M which closes its contacts M1 to complete an energizing circuit for the selected up switch or down switch U or D. When either of these switches is operated, an auxiliary car running relay N also is energized. In addition, a holding relay 1 or 2 is energized for the purpose of establishing a holding circuit for either the up direction switch U or the down direction switch D.

When either the up direction relay UR or the down direction relay DR is energized, back contacts UR3 and DR3 are open to deenergize the leveling inductor relay IL and the slowdown inductor relay 2L.

As a result of energization of the auxiliary car running relay N, contacts N5 close to energize a holding relay H and the speed control relay GR. The holding relay when energized establishes a holding circuit for the car running relay M and, under certain conditions when deenergized, establishes a holding circuit for either the up direction switch U or the down direction switch D, depending upon which is energized. The speed control relay GR operates various contacts for the purpose of determining the speed of the motor MO.

Various conventional safety devices, such as top limit switches TL, bottom limit switches BL and door safety switches 85, are provided. One of the door safety switches may be employed for each floor or hall door, and for the elevator door. Each safety switch is open when its associated door is open. A manually operable switch 87 also may be provided for preventing energization of the up and down direction switches.

It is believed that the control system can best be described by analyzing its operation during the travel of the elevator car. Let it be assumed initially that the car C is at the first floor and that it is desired to move the car C from the first floor to the third floor of the associated building. The operator first closes his car door and the hall door on the first floor, and then rotates his car switch CS in a clockwise direction to energize the up direction relay UR. The energizing circuit is

B1, DR2, UR, CS, B2

In response to its energization, the up direction relay UR closes its front contacts UR1 to condition the up direction switch U for subsequent energization. Also, the back contacts UR2 open to prevent energization of the down direction relay DR. Opening of the back contacts UR3 deenergizes the leveling inductor relay 1L and the slowdown inductor relay 2L. Finally, closure of the front contacts UR4 energizes the car running relay M.

At this stage of the operation, the contacts 2UL and 2DL of the slowdown inductor relay are closed. The contacts 1UL and 1DL of the leveling inductor relay also are closed. It is believed that the construction and operation of the inductor relays are well known. As well understood in the art, an inductor relay has an energizing winding which when energized is ineffective to actuate its associated contacts unless the inductor relay, which is mounted on the elevator car, is adjacent a magnetic inductor plate which is mounted in the elevator hatch. Inductor plates are positioned in the hatch for each floor to actuate appropriate inductor relay contacts at predetermined distances from the desired floor.

Figure 3:
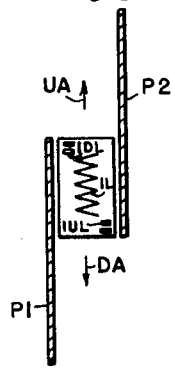
Fig. 3 is a view in section with parts schematically shown of an inductor relay suitable for the system of Fig. 1.

To facilitate an understanding of the inductor relay, reference may be made to Fig. 3 wherein the inductor relay 1L is illustrated. It is assumed that the car is accurately located at its first floor landing. With the car so located, the inductor relay 1L mounted on the car is located between the two inductor plates P1 and P2 for the first floor, which are secured in the hatch. If the winding of the inductor relay 1L is energized, the contacts 1DL and 1UL are open for the reason that the inductor plates P1 and P2 complete the magnetic circuits for actuating the contacts 1DL and 1UL. If the car were to move in an upward direction represented by the arrow UA for a predetermined distance, such as three-quarters of an inch, the plate P1 would fail to complete the magnetic circuit for the contacts 1DL, and these contacts would close, even though the winding of the inductor relay 1L remained energized. Conversely, if the elevator car were to move in a downward direction as represented by the arrow DA for a predetermined distance, such as three-quarters of an inch, from the position illustrated in Fig. 3, the plate P2 would fail to complete its magnetic circuit, and the contacts 1UL would close, even though the winding of the relay 1L remained energized. An inductor relay of this general type will be found in the Santini Patent 2,298,174.

Inasmuch as the up leveling relay LU is energized, its contacts LU1 and LU3 are open, and its contacts LU2, LU4 and LU5 are closed. Similarly, inasmuch as the down leveling relay LD is energized, the contacts LD1 and LD2 are open, and the contacts LD3, LD4 and LD5 are closed. Since both contacts LU5 and LD5 are closed, the auxiliary relay L is energized, and its back contacts L1 are open.

Returning now to the car running relay M, it will be noted that closure of the contacts M1 energizes the up direction switch through the circuit,

B1, 85, 87, D5, U, TL, UR1, M1, B2

The up direction switch U closes its front contacts U1 and U2 to connect a speed voltage appearing between the conductors 69 and 71 with proper polarity relative to the pattern voltage appearing between the conductors 61 and 63. The contacts U3 and U4 close to connect the regulating field GF2 with proper polarity for upward travel of the elevator car C. The contacts U6 open to prevent energization of the down direction switch D.

Closure of the front contacts U5 of the up direction switch connects the holding relay I and the auxiliary car running relay N for energization in parallel with the up direction switch U. The holding relay I closes its front contacts I—1 to establish a holding circuit in cooperation with the contacts LU2 across the contacts UR1 of the up direction relay. The holding relay also closes its contacts I—2 to prepare the speed control relay GR for energization.

In response to energization of the auxiliary car running relay, the back contacts N1 open to disconnect the generator field winding GF1 from the conductor 35. The contacts N4 close to release the brake shoe 19 from the brake drum 17 in the manner previously discussed. The contacts N5 close to energize the holding relay H through the circuit,

B1, LU4, LD4, H, N5, B2

In addition, the speed control relay GR is energized through the circuit,

B1, 2UL, TL, I—2, GR, N5, B2

Energization of the holding relay H opens back contacts H1. This has no immediate effect on the operation of the elevator system. In addition, contacts H2 close to establish a holding circuit for the car running relay M around the contacts UR4.

Energization of the speed control relay GR opens the back contacts GR2 and closes the front contacts GR1 and GR4 to connect the generator field winding GF1 across the conductors 33 and 35 with proper polarity to act cumulatively with the regulating field winding GF2. The front contacts GR3 close for the purpose of applying the desired motor speed voltage between the conductors 69 and 71. The contacts GR5 close to connect the conductor 63 to the tap 59A for the purpose of applying the correct pattern voltage between the conductors 61 and 63. The back contacts GR6 of the speed control relay open at this time for the purpose of disconnecting the conductor 63 from the tap 59B. The back contacts GR7 open but have no immediate effect on the operation of the system.

Since the pattern voltage appearing between the conductors 61 and 63 is opposed by a zero motor speed voltage, a substantial error voltage is applied between the grids and cathodes of the thyratrons, and maximum excitation is applied to the regulating field winding GF2. As the generator voltage increases, the generator field winding GF1 is excited to assist the regulating winding GF2. The motor speed voltage appearing between the conductors 69 and 71 increases as the motor MO picks up speed. Consequently, the error voltage applied between the grids and cathodes of the thyratrons decreases until the elevator car reaches full speed. At this time, the thyratrons fire at a rate sufficient merely to maintain the elevator car at the desired full speed.

If the operator desires to stop his car at the third floor of the building, he centers his car switch CS after passing the second floor, and consequently he deenergizes the up direction relay UR. The contacts UR1 promptly open, but since they are by-passed by the contacts 1—1 and LU2 in series, the opening of the contacts UR1 has no immediate effect on the operation of the system. The contacts UR2 reclose to condition the down direction relay DR for subsequent energization.

Closure of the back contacts UR3 energizes the slowdown inductor relay 2L through the circuit,

B1, 2L, UR3, DR3, B2

However, the contacts of the slowdown inductor relay cannot operate until the inductor relay reaches its associated up direction inductor plate for the third floor. The slowdown inductor relay mounted on the car reaches its associated up direction inductor plate at the third floor when the elevator car is at a predetermined distance, such as three feet from the third floor (this distance may be suitable, for example, for an elevator car having a full speed of the order of 200 feet per minute).

When the slowdown inductor relay reaches the associated inductor plate for the third floor, its up direction contacts 2UL open to deenergize the speed control relay GR. The speed control relay promptly closes its contacts GR7 to energize the leveling inductor relay 1L. However, the contacts of the leveling inductor relay 1L cannot operate until the inductor relay 1L reaches its associated inductor plates for the third floor.

Contacts GR1 and GR4 open to disconnect the generator field winding GF1 from the associated conductors 33 and 35. Back contacts GR2 close but do not establish a complete connection for the generator field winding GF1 for the reason that the back contacts N1 and L1 still remain open.

The front contacts GR5 open to disconnect the conductor 63 from the tap 59A. Back contacts GR6 close to connect the conductor 63 to the tap 59B through the resistor 65. Also, the contacts GR3 open to transfer the connection of the conductor 71 to the tap 75B. The change in the pattern voltage corresponding to the change from the tap 59A to the tap 59B, is gradual because of the delay action introduced by the capacitor 67 and resistor 65. In response to the change in pattern voltage and the consequent change in field excitation of the generator G, the motor MO decelerates, and the elevator car approaches gradually its landing speed.

At a predetermined distance from the third floor (such as seven inches), the leveling inductor relay reaches its inductor plate P1 for the third floor, and the contacts 1DL of the leveling inductor relay open to deenergize the down leveling relay LD. The down leveling relay closes its contacts LU1 to shunt the resistor 65. Because of the time constant of the resistor 65 and the capacitor 67, the elevator car speed approaches its landing value at an exponential rate, with respect to time. The final 10% of the delay in speed occurs very slowly. However, the shunting of the resistor 65 by the contacts LD1 definitely forces the elevator car to the desired landing speed. The contacts LD2 close but have no immediate effect on the operation of the system. The contacts LD3 open but again have no effect on the immediate operation of the system. The contacts LD4 open to deenergize the holding relay H. Finally, the contacts LD5 open to deenergize the auxiliary relay L.

The relay L closes its back contacts L1 to complete a connection of the generator field winding GF1 across the conductors 33 and 35 through the back contacts GR2 with proper polarity for opposing the field produced by the generator field winding GF2. The parameters of the circuits may be such that the generator field winding GF1 produces twice the value of the resultant magnetomotive force required for the generator, whereas the generator field winding GF2 produces approximately three times the resultant magnetomotive force required by the generator. Since these field windings are differentially associated, the net field excitation of the generator is equal to the desired value. At the same time, the thyratrons operate at a level sufficiently high to assure stable operation thereof. With the field windings differentially connected, the regulator forces the motor and car speed to follow the pattern established by the pattern voltage.

Inasmuch as the holding relay H has been deenergized, its back contacts H1 close to establish with the contacts LD2 and 1—1 a holding circuit around the contacts M1. The opening of the contacts H2 deenergize the car running relay M, but the resultant opening of the contacts M1 has no effect immediately on the operation of the system because of the aforesaid holding circuit therearound.

The differential connection of the generator field windings in cooperation with the change in the values of the pattern and speed voltages results in the continued approach to the third floor of the elevator car at a predetermined slow landing speed. At approximately three-quarters of an inch from the floor, the leveling inductor relay 1L reaches the inductor plate P2 for the third floor to open its contacts 1UL. The contacts in opening deenergize the up leveling relay LU. The resulting closure of the contacts LU1 and LU3 has no immediate effect on the operation of the system. The opening of the contacts LU4 and LU5 also has no immediate effect on the operation of the system. However, the opening of the contacts LU2 results in deenergization of the relays U, N and I. The holding relay I opens its contacts 1—1 and 1—2 without further effect on the system. The up direction switch U opens its contacts U1 and U2 to disconnect the speed voltage from the thyratron system. The contacts U3 and U4 open to disconnect the generator field winding GF2 from the thyratron circuit. The contacts U5 open but have no immediate effect on the operation of the system. The contacts U6 close to condition the down direction switch D for subsequent energization.

The deenergization of the auxiliary car running relay N results in closure of the contacts N1. Because the generator field winding GF1 acts in opposition to the resultant generator field, upon the disconnection of the generator field winding GF2, the generator field winding GF1 rapidly reduces the voltage output of the generator G and effectively kills any residual magnetism in the generator. The opening of the contacts N4 results in reapplication of the brake shoe 19 to the drum 17 to bring the car to a stop accurately at the third floor. The opening of the contacts N5 has no immediate effect on the operation of the system but merely conditions it for subsequent operation.

Should the car overrun the third floor by a predetermined distance, such as three-quarters of an inch, the leveling inductor relay 1L leaves its associated plate P1 sufficiently to result in closure of the contacts 1DL. These contacts in closing energize the down leveling relay LD. The contacts LD3 establish a circuit for the down direction switch D as follows:

B1, 85, 87, U6, D, BL, LD3, LU3, H1, B2

The down direction switch closes its contacts D1 and D2 to connect the speed voltage between the conductors 69 and 71 in proper polarity relative to the pattern voltage occurring between the conductors 61 and 63. The contacts D3 and D4 close to connect the generator field winding GF2 with proper polarity for downward travel of the elevator car. The contacts D5 open to prevent subsequent energization of the up direction switch U. The contacts D6 close to connect the holding relay 2 and the auxiliary car running relay N in parallel with the down direction switch D for energization. The holding relay 2 closes its contacts 2—1, but this has no effect on the operation of the system. Also, the holding relay 2 closes its front contacts 2—2 to prepare the speed control relay GR for energization.

The auxiliary car running relay N opens its contacts N1, but this has no immediate effect on the operation of the system. Contacts N4 close to release the brake in a manner previously discussed. The contacts N5 close, but such closure does not result in energization of the speed control relay GR for the reason that the contacts 2DL remain open. The relay H remains deenergized for the reason that the contacts LU4 remain open. Since the pattern voltage has substantially zero motor speed voltage opposing it, a substantial error voltage is applied to the thyratrons, and the generator field winding GF2 is energized to move the car in a downward direction. In its downward travel, the leveling inductor relay 1L again reaches a position relative to its associated inductor plate P1 wherein the contacts 1DL again open. Such opening deenergizes the down leveling relay LD which opens its contacts LD3 to deenergize the down direction switch D, the holding relay 2 and the auxiliary car running relay N. The holding relay 2 opens its contacts 2—1 and 2—2, but these have no immediate effect on the operation of the system. The down direction switch D opens its contacts D1 and D2 to disconnect the speed voltage from the thyratron circuit. The contacts D3 and D4 open to disconnect the generator field winding GF2 from the thyratron circuit. The contacts D5 and D6, respectively, close and open to restore the system for further operation.

The auxiliary car running relay N, when energized, closes its contacts N1, but this has no immediate effect on the operation of the system. The contacts N4 open to permit reapplication of the brake in a manner previously discussed. The contacts N5 open, and the remaining contacts of the relay LD are actuated to restore the system for further operation without producing any immediate effect thereon. The car now is accurately located at the third floor.

Next it will be assumed that the elevator operator is desirous of returning the elevator car from the third floor to the first floor of the building in which the elevator system is installed. After closing the hall and car doors, he actuates the car switch CS in a counterclockwise direction to establish the following circuit for the down direction relay DR,

B1, UR2, DR, CS, B2

In response to its energization, the down direction relay closes its front contacts DR1 to condition the down direction switch D for subsequent energization. Opening of the contacts DR2 prevents energization of the up direction relay UR. Opening of the back contacts DR3 deenergizes the leveling relay 1L and the slowdown inductor relay 2L. Closure of the contacts DR4 energizes the car running relay M.

With the inductor relays deenergized, the contacts 2UL and 2DL are closed, and the contacts 1UL and 1DL also are closed. The leveling relays LU and LD are both energized which means that the contacts LU1, LD1, LU3 and LD2 are open, whereas the contacts LU2, LU4, LU5, LD3, LD4 and LD5 are all closed.

When the contacts M1 of the car running relay close, the down direction switch D is energized through the circuit,

B1, 85, 87, U6, D, BL, DR1, M1, B2

The contacts D1 and D2 close to connect the source of speed voltage represented by the conductors 69 and 71 with proper polarity to the source of pattern voltages represented by the conductors 63 and 61 for downward travel of the elevator car. The contacts D3 and D4 close to connect the generator field winding GF2 with proper polarity for downward travel of the elevator car. The back contacts D5 open to prevent subsequent energization of the up direction switch U. The front contacts D6 close to connect the holding relay 2, and the auxiliary car running relay N in parallel with the down direction switch D for energization.

The holding relay 2 closes its contacts 2—1 to establish through the contacts LD3 a holding circuit around the contacts DR1. In addition, the contacts 2—2 are closed to prepare the speed control relay GR for energization.

Energization of the auxiliary car running relay N opens its back contacts N1. Since the contacts L1 also are open because the relay L is in energized condition, the field winding GF1 is disconnected from the conductor 35. The contacts N4 close to release the elevator brake in the manner previously described. The contacts N5 close to energize the speed control relay GR through the circuit,

B1, 2DL, BL, 2—2, GR, N5, B2

In addition, the holding relay H is energized through the circuit,

B1, LU4, LD4, H, N5, B2

The relay H closes its front contacts H2 to establish a holding circuit for the car running relay M and opens its back contacts H1.

The speed control relay GR operates in exactly the same manner discussed with reference to upward travel of the elevator car. However, since the action of the down direction switch D has conditioned the elevator car for down travel, the elevator car moves in a down direction and reaches its full speed.

In order to stop at the first floor, the car operator may center his car switch CS as he passes the second floor. The resulting deenergization of the down direction relay DR opens the front contacts DR1, but since these contacts are shunted by the contacts 2—1 and LD3, such opening does not affect the operation of the system. The contacts DR2 close to prepare the up direction relay UR for subsequent energization. The contacts DR3 close to energize the slowdown inductor relay 2L through the circuit,

B1, 2L, UR3, DR3, B2

The contacts DR4 open but are by-passed by the closed contacts H2.

The energization of the winding of the slowdown inductor relay 2L has no effect until the car is within the predetermined distance, such as three feet, from the first floor. At this point, the inductor relay cooperates with its associated inductor plate at the first floor to open its down direction contacts 2DL. This results in deenergization of the speed control relay GR.

The speed control relay GR operates in exactly the same manner discussed with reference to the slowing down of the elevator car as it approaches the third floor during up travel to slow down the elevator car C as it approaches the first floor.

The closing of the contacts GR7 results in energization of the leveling inductor relay 1L. When the elevator car is within a predetermined distance from the first floor, such as seven inches, the inductor relay 1L cooperates with its associated inductor plate P2 to open the contacts 1UL. These contacts in opening deenergize the up leveling relay LU. The contacts LU1 close to shunt the resistor 65. Contacts LU2 open, and contacts LU3 close without immediately effecting the operation of the system. Contacts LU4 open to deenergize the holding relay H, and contacts LU5 open to deenergize the relay L.

As a result of deenergization of the relay L, the contacts L1 close to connect the generator field winding GF1 across the conductors 33 and 35 with proper polarity to produce a magnetomotive force opposing that produced by the generator field GF2. The resulting differential field operates in the same manner discussed with reference to the travel of the up traveling car within seven inches of the third floor to produce a slow landing speed for the elevator car.

The deenergization of the relay H closes the contacts H1, which cooperate with the contacts LU3 to establish a holding circuit around the contacts M1. The contacts H2 open to deenergize the car running relay M which opens its contacts M1. However, since the contacts M1 have a bypass circuit therearound, their opening has no immediate effect on the operation of the system.

When the down traveling elevator car is within a predetermined distance, such as three-quarters of an inch, from the first floor, the leveling inductor relay cooperates with the associated inductor plate P1 for the first floor to open its contacts 1DL. As a result, the down leveling relay LD is deenergized. The contacts LD1 and LD2 are closed, whereas the contacts LD3, LD4 and LD5 are opened. Closure of the contacts LD1 and LD2 has no immediate effect on the operation of the system. Opening of the contacts LD3 deenergizes the down direction switch D, the holding relay 2 and the auxiliary car running relay N. The holding relay 2 opens its contacts 2—1 and 2—2 without effecting the immediate system operation. The down direction switch D opens its contacts D1 and D2 to disconnect the conductors 69 and 71 from the associated conductors 57 and 63. The contacts D3 and D4 open to isolate the generator field winding GF2. The contacts D5 close and the contacts D6 open to condition the system for subsequent operation.

The deenergization of the auxiliary car running relay N closes the back contacts N1 and opens the front contacts N4. Opening of the latter contacts results in application of the brake to bring the elevator car to an accurate stop at the first floor. During the stop, the generator field winding GF1 remains energized in a direction to kill any residual voltage and field in the generator G. The contacts N5 also open to prepare the system for subsequent operation.

If the elevator car overruns the first floor for a predetermined distance, such as three-quarters of an inch or more, the leveling inductor relay 1L leaves the associated inductor plate P2 sufficiently to permit closure of the contacts 1UL. In closing, these contacts energize the up leveling relay LU. The contacts LU1 open but have no effect on the operation of the system. The contacts LU2 close to establish the following circuit for the up direction switch U,

B1, 65, 67, D5, U, TL, LU2, LD2, H1, B2

The contacts LU3 open and the contacts LU4 and LU5 close, but these have no effect on the immediate system operation.

The energization of the up direction switch U closes contacts U1 and U2 to connect the source of speed voltage represented by the conductors 69 and 71 to the conductors 63 and 57 with proper polarity for up travel of the elevator car. The contacts U3 and U4 close to connect the generator field winding GF2 to the associated thyratrons with proper polarity for up travel of the elevator car C. The contacts U6 open to prevent energization of the down direction switch D, and the contacts U5 close to connect the holding relay 1 and the auxiliary car running relay N in parallel with the up direction switch U for energization.

Closure of the contacts 1—1 has no effect on the system of operation. Closure of the contacts 1—2 also has no effect for the reason that the contacts 2UL are open.

Since the system now is connected for slow speed up travel of the elevator car, the car moves in an upward direction. When the car returns within three-quarters of an inch of the first floor, the leveling inductor relay 1L cooperates with its associated inductor plate P2 to open the contacts 1UL. Opening of the contacts 1UL deenergizes the up leveling relay LU. The contacts LU1 and LU3 close, whereas the contacts LU2, LU4, and LU5 open. In opening, the contacts LU2 deenergize up direction switch U and the relays 1 and N. The contacts 1—1 and 1—2 return to their open condition. The contacts U1 and U2 open to disconnect the conductors 69 and 71 from the conductors 57 and 63. The contacts U3 and U4 open to isolate the generator field winding GF2. The contacts U5 open and the contacts U6 close to prepare the system for subsequent operation.

The relay N closes its back contacts N1 and opens its front contacts N4. The opening of the contacts N4 results in application of the brake to bring the car to a stop accurately at the first floor. The contacts N5 open to complete a restoration of the system for subsequent operation.

Figure 2:
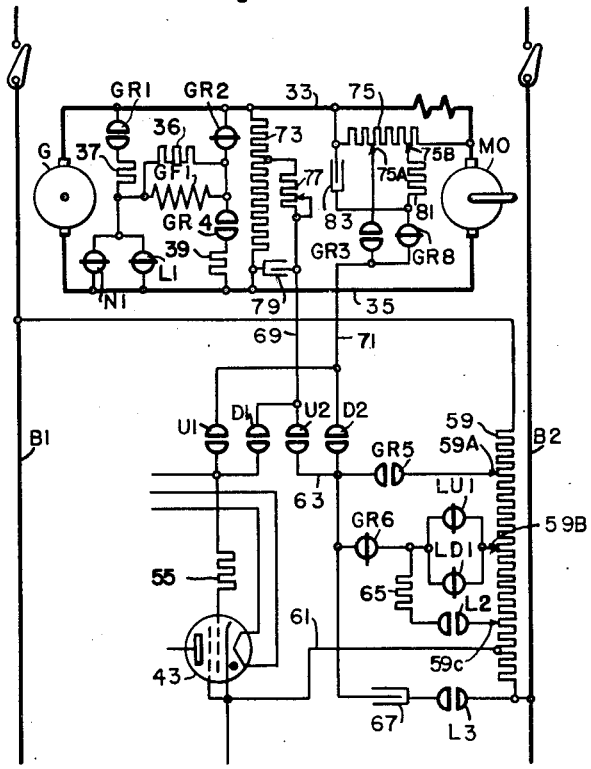
Fig. 2 is a schematic view showing a modified form of the elevator system illustrated in Fig. 1.
Figure 2A:
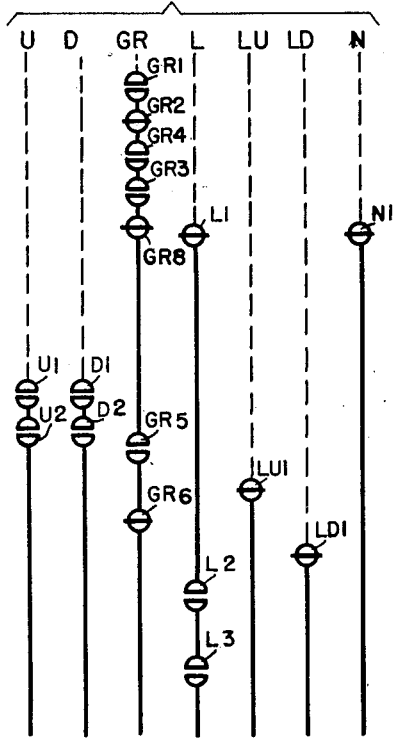
Fig. 2A is a key diagram showing the vertical positions of contacts employed in the system of Fig. 2.

Fig. 2 shows a modification of the system illustrated in Fig. 1. Since the parts of the two systems are the same with the exception of a few changes, only enough of the system of Fig. 1 is reproduced in Fig. 2 to illustrate the changes therein.

It may be observed that in Fig. 2 the connection of the conductor 71 to the tap 75B is effected through a pair of back contacts GR3 on the speed control relay. Consequently, when the contacts GR3 close to connect the conductor 71 to the tap 75A, the contacts GR3 open to remove the shunt circuit which would otherwise be established across the resistor 81 and a portion of the voltage divider 75.

A further change may be noted in the connections to the voltage divider 59. It will be noted that the resistor 65 no longer is connected between the contacts GR6 and the tap 59B. Instead the resistor 65 is connected between the contacts GR6 and an additional tap 59C through an additional pair of contacts L2 on the relay L.

When the contacts GR6 and L2 are closed, a pattern voltage is applied between the conductors 61 and 63, which is substantially lower than that obtained from the tap 59B. When the speed control relay GR operates to retard the elevator car, the contacts L2 are closed and the conductor 63 is connected through the resistor 65 to the tap 59C. Since the pattern voltage appearing between the conductors 61 and 63 is less than that required to produce the final desired landing speed, a high rate of retardation is available for the motor MO. When the elevator car reaches a point seven inches from the floor at which it is to land, one of the leveling relays LU or LD operates to deenergize the relay L and open the contacts L2 and L3. At the same time, one of the contacts LU1 and LD1 is closed. This raises the pattern voltage appearing between the conductors 61 and 63 to the value represented by the tap 59B, which is sufficient to produce a desired landing speed. By increasing the initial rate of retardation of the elevator car, the elevator car can be brought definitely approximately to the desired slow landing speed before it reaches a point seven inches from the desired floor. The transfer of the pattern voltage to the tap 59B then assures maintenance of the desired landing speed.

It will be noted that the system of Fig. 2 solves the problem of forcing the elevator car definitely to a desired landing speed in a manner somewhat different from that discussed for Fig. 1. In Fig. 1, the shunting of the resistor 65 by the contacts LU1 or LD1 is employed for this purpose. In Fig. 2, the tap 59C assures a reasonably rapid drop in speed to the desired landing value. This drop occurs on the portion of the exponential characteristic of the capacitor 67 and the resistor 65 wherein the rate of change of speed is reasonably high. The shift from the tap 59C to the tap 59B thereafter establishes the desired landing speed. The contacts L3 may be permanently closed or replaced by a solid connection between the capacitor and the negative terminal of the voltage divider with good results.

The tap on the voltage divider 73 may be made adjustable for the purpose of adjusting the speed voltage. Similarly the resistor 77 may be adjustable for the purpose of adjusting the damping introduced in the system.

Various grid-controlled rectifiers may be employed, such as type 2050 thyratrons or type 3D22 thyratrons. If two or more thyratrons are operated in parallel for greater current capacity, a resistor should be introduced in series with the main electrodes of each of the tubes to assure good division of current between the tubes.

Referring again to the damping introduced by the resistor 77 in association with the capacitor 79, it should be noticed that the polarity of the damping voltage depends on the conductor 33 or 35 to which the left-hand end of the capacitor in Figs. 1 and 2 is connected. If the capacitor is connected to the wrong conductor, hunting is increased rather than decreased. The magnitude of the damping voltage can be varied also by changing the magnitude of the capacitance of the capacitor.

When applied to an elevator system, it has been found that the invention permits faster acceleration and deceleration of an elevator car than heretofore were practicable, with a resultant overall decrease in the time required for travel from floor to floor. Also, the improved regulation of speed afforded by the invention results in more accurate floor stops. It may be pointed out that very small adjustable resistors or voltage dividers suffice for the various adjustments.

Although the invention has been described with reference to certain specific embodiments thereof, such embodiments are presented in an illustrative rather than a limiting sense. Numerous modifications of the system are possible falling within the spirit and scope of the invention.

We claim as our invention:

1. In a variable-voltage system, a generator, a motor, connections for energizing the motor in accordance with the voltage output of the generator, a first source of field excitation for the generator, a controlled rectifier for supplying direct current, a second source of field excitation for the generator, said second source being energized from said rectifier, and control circuits connecting the first and second sources for cumulatively exciting the generator during acceleration and full speed operation of the motor, said control circuits connecting the first and second sources differentially during deceleration of the motor.

2. A system as defined in claim 1 wherein the rectifier output is controlled in accordance with the difference in the speed of the motor and a pattern quantity.

3. A system as defined in claim 2 wherein the first source comprises a shunt field for the generator.

4. A system as defined in claim 2 in combination with an elevator car driven by the motor, said first source supplying approximately half of the generator field excitation for full-load up-travel of the elevator car and substantially all generator field excitation for full-load down-travel of the elevator car.

5. A system as defined in claim 1 wherein the control circuits connect the motor for full-speed and slow-speed operation, said sources being differentially connected for slow-speed operation with the first and second sources supplying excitation substantially in the ratio of magnitudes 2/3.

6. In an elevator system, a generator, a motor connected for energization in accordance with the generator voltage, an elevator car driven by the motor, a shunt field winding for the generator, a grid-controlled source of electricity, a separately-excited field winding for the generator energized from the source, and control circuits connecting the field windings cumulatively for motor acceleration and for full-speed motor operation, said control circuits reversing the connections of the shunt field winding for operation of the motor at a slow elevator landing speed.

7. An elevator system as defined in claim 6 wherein the separately-excited field winding is proportioned to supply a preponderance of the field excitation for the generator during operation of the motor at the slow elevator landing speed in combination with connections for controlling the grid-controlled source in accordance with the difference between a quantity representing the motor speed and an adjustable pattern quantity.

8. In an electrical system, a motor, a network for deriving a voltage representing the speed of the motor, and connections adjustable for changing the magnitude of the voltage, said connections including a network having a time constant for controlling the rate of change of the voltage following a change in the adjustment thereof.

9. In an electrical system, a motor, connections for deriving from the motor a voltage representative of the terminal motor voltage, adjustable compensating connections for combining with the voltage a compensating voltage proportional to the motor armature current to obtain a resultant voltage proportional to the motor counter-electromotive force, said compensating connections including a resistor-capacitor connection having a time constant for improving the transition between successive adjustments of the compensating voltage.

10. In a direct-current motor system, an electric motor, a regulating unit for supplying various energizations to the motor for operating the motor at various speeds, a source of speed voltage representative of the speed of the motor, and a voltage modifier for modifying the relationship between the speed voltage and the motor speed in response to a substantial change in the energization of the motor.

11. A motor system as defined in claim 10 wherein the speed voltage comprises a first component representative of the voltage applied to the motor and a second component representative of resistance drops in the motor due to load current supplied to the motor, said voltage modifier operating to modify the ratio of the components in response to a change in the energization of the motor to produce a substantially different motor speed.

12. A motor system as defined in claim 11 wherein the voltage modifier includes a circuit having a substantial time constant for making a change in said ratio a gradual change.

13. A motor system as defined in claim 12 in combination with a source of adjustable pattern voltage, said regulating unit energizing the motor in accordance with the difference between the pattern and speed voltages, said voltage modifier being responsive to a change in the pattern voltage to produce a change in motor speed for changing said ratio.

14. A system as defined in claim 1 in combination with connections providing an adjustable voltage representative of speed of the motor, a source of pattern voltage, and connections for controlling the rectifier output in accordance with the difference between the adjustable voltage and the pattern voltage, said first-named connection including a resistor and capacitor providing a time constant for a change in the adjustable voltage.

15. An elevator system as defined in claim 7 wherein the quantity representing motor speed is adjustable, the connection for providing the adjustable quantity including a substantial time constant for controlling the rate of change in the quantity following an adjustment thereof.

16. In an electric system, a load mechanism including an electric motor for translating the load along a given path at a fast speed or a slow speed, a regulating unit for controlling the energization of the motor to vary the motor speed, means responsive to arrival of the load at a predetermined point in the path for adjusting the regulating unit from a condition producing the fast speed to a condition producing a speed slower than the slow speed, said means being responsive to arrival of the load at a succeeding point in said path for adjusting the regulating unit to produce the slow speed.

17. A system as defined in claim 16 wherein the energization supplied by the regulating unit to the motor varies as a function of the difference between a quantity representing motor speed and a reference quantity.

18. In an electrical system, a generator, a motor connected for energization in accordance with the generator output, a grid-controlled gaseous-discharge tube, a field winding for said generator energized through the tube, an error circuit for applying to the grid-control circuit of the tube an error voltage representing the deviation of the motor speed from a predetermined pattern, and means responsive to current flowing in the error circuit through the tube for producing an auxiliary grid bias to increase the output of the tube.

19. A system as defined in claim 18 wherein the means comprises a resistor in the error circuit for producing a grid biasing voltage drop in response to grid current flowing therethrough, and a filter capacitor for said voltage drop.

20. In an elevator system, an elevator car for serving a plurality of floors in a building, a direct-current motor for driving the elevator car in a predetermined path at a fast speed or a slow speed, a direct-current generator for energizing the motor, a shunt field for the generator, a source of adjustable direct pattern voltage, a source of adjustable direct speed voltage representing the speed of the motor, a separately-excited field for the generator, a control circuit for energizing the separately excited field in accordance with the error difference between the speed voltage and the pattern voltage, a control circuit for connecting the shunt field cumulatively with the separately-excited field during fast-speed operation of the elevator car and differentially relative to the separately-excited field during slow-speed operation of the elevator car, and circuit connections operable for retarding the elevator car from the fast speed to the slow speed, said circuit connections being effective for changing the speed voltage from a first to a second compounding suitable for slow speed operation of the elevator car.

21. An elevator system as defined in claim 20 wherein the control circuit for the separately-excited field includes a grid-controlled gaseous tube for supplying current to the field, the grid circuit for the tube including a resistor responsive to grid current for biasing the tube regeneratively, and a capacitor connected across the resistor to make the bias therefrom substantially a direct-current bias.

22. An elevator system as defined in claim 20 wherein the circuit connections are effective during a retarding operation for initially changing the pattern voltage to a value tending to produce a motor speed slower than said slow speed, and subsequently changing the pattern voltage to a value producing said slow speed.

23. An elevator system as defined in claim 20 wherein the circuit connections are responsive to arrival of the elevator car at a first predetermined distance from a floor at which the elevator car is to stop for initiating the retarding operation of the elevator car, said circuit connections being responsive to subsequent arrival of the elevator car at a second predetermined distance from said floor for producing said subsequent change in the pattern voltage to a value producing said slow speed, in combination with a brake for the elevator car and a brake applier for applying the brake to bring the elevator car to a stop from said slow speed accurately at said floor.

24. In an electrical system, a load, a motor for propelling the load along a predetermined path, a pattern-voltage-responsive regulating unit having terminals, said regulating unit applying to the motor an energization controlled by a function of the magnitude of a pattern voltage applied to the terminals, a source of a first pattern voltage, a source of a second pattern voltage, said pattern voltages having different magnitudes, switching mechanism responsive to arrival of the load at a preselected position in said path for transferring the terminals from one to the other of the sources, said switching mechanism including reactive and resistive impedance having a substantial time constant for effecting a gradual change in the pattern voltage applied to the terminals following a shift in the connection of the terminals from one to the other of the sources.

ALVIN O. LUND.
CHARLES A. DANA.

REFERENCES CITED

The following references are of record in the file of this patent:

UNITED STATES PATENTS

| Number | Name | Date |
|---|---|---|
| 1,884,446 | White et al. | Oct. 25, 1932 |
| 2,275,930 | Torcheaux | Mar. 10, 1942 |
| 2,298,174 | Santini | Oct. 6, 1942 |
| 2,313,955 | Martin et al. | Mar. 16, 1943 |
| 2,389,367 | King | Nov. 20, 1945 |